United States Patent [19]
Burr et al.

[11] 3,950,662
[45] Apr. 13, 1976

[54] SELF-COMMUTATING MOTOR AND PRINTED CIRCUIT ARMATURE THEREFOR

[75] Inventors: Robert Page Burr; Raymond J. Keogh, both of Huntington, N.Y.

[73] Assignee: Photocircuits Division of Kollmorgen Corporation, Hartford, Conn.

[22] Filed: June 4, 1974

[21] Appl. No.: 476,280

[52] U.S. Cl. .................. 310/46; 310/154; 310/236; 310/265; 310/DIG. 5
[51] Int. Cl.² ........................................ H02K 37/00
[58] Field of Search ......... 310/236, 46, 75, 195, 45, 310/49, 154, 261, 266, 264, 268, 265, 233, 239, DIG. 6, 136, 140; 226/95, 188; 29/597, 420, 598, 625; 174/174.11

[56] References Cited
UNITED STATES PATENTS

| | | | |
|---|---|---|---|
| 3,382,570 | 5/1968 | Knapp | 310/268 |
| 3,490,672 | 1/1970 | Fisher | 310/75 |
| 3,512,251 | 5/1970 | Kitamori | 310/44 |
| 3,588,556 | 6/1971 | Guzman | 310/266 |
| 3,609,430 | 9/1971 | Buffington | 310/265 |
| 3,634,708 | 1/1972 | Fisher | 310/195 |
| 3,648,360 | 3/1972 | Tucker | 310/268 |
| 3,668,452 | 6/1972 | Hu | 310/266 |
| 3,694,904 | 10/1972 | Margrain | 310/264 |
| 3,698,079 | 10/1972 | Lifschitz | 310/266 |
| 3,805,104 | 4/1974 | Margrain | 310/266 |

*Primary Examiner*—R. Skudy
*Attorney, Agent, or Firm*—Morgan, Finnegan, Pine, Foley & Lee

[57] ABSTRACT

A self-commutating motor including main magnets to provide a magnetic field and a rotatable printed circuit armature positioned therebetween. The armature rotates in a self-commutating fashion with a pair of centrally-mounted brushes. The printed circuit armature includes two insulating layers having printed circuit conductive elements thereon, and a low reluctance laminated core to which the layers are bonded. The conductive elements may be skewed to a maximum of about 3° and the conductive elements of each layer are electrically interconnected so that the forces on the conductive elements, resulting from interaction of the current flowing in the conductors with the magnetic field, cooperate to apply a torque to the armature of the motor.

18 Claims, 3 Drawing Figures

SELF-COMMUTATING MOTOR AND PRINTED CIRCUIT ARMATURE THEREFOR

The present invention relates to D.C. servomotors, and more specifically, to a self-commutating D.C. motor and a printed circuit armature therefor.

Various printed circuit armature constructions are known in the art. Examples of such constructions are found in U.S. Pat. Nos. 3,490,672 (Fisher et al.), 3,512,251 (Kitamori et al.), 3,623,220 (Chase et al.), 3,650,021 (Karol), 3,678,313 (Parker), 3,694,907 (Margrain et al.), and 3,698,079 (Lifschitz). These known printed circuit armatures generally include parallel conductors with crossover end sections to advance the winding the required distance. The conductors are formed on the inner and outer surfaces of an insulating layer with printed circuit techniques and the layer is shaped into a sleeve and mounted for rotation about a non-rotatable core, see Fisher et al. 3,490,672 and Parker et al. 3,678,313.

It is an object of the present invention to provide a high performance D.C. motor.

It is a further object of the present invention to provide a D.C. motor having a smooth torque output over a wide speed range.

It is a still further object of the present invention to provide a D.C. motor having a low inertial time constant and therefor rapid response.

It is a still further object of the present invention to provide a D.C. motor having relatively low running losses.

It is a still further object of the present invention to provide a D.C. motor of small dimensions which is suitable for use in applications where space is limited.

It is a still further object of the present invention to provide a D.C. motor of simple construction to minimize tooling costs.

It is a still further object of the present invention to provide an improved printed circuit armature for D.C. motors.

It is a still further object of the present invention to provide a printed circuit armature having low inertia.

Other objects, aspects, and advantages of the present invention will be apparent when the detailed description is considered with the accompanying drawings.

Briefly, the present invention comprises a cylindrical printed circuit armature including two insulating layers bonded to a laminated core. Each layer includes a plurality of conductors adhered to a sheet of insulation. The conductors may be straight or advantageously they may be skewed to a maximum of about 3°. The insulating layers are bonded together and mounted on a rotatable low reluctance laminated core. Four flat rectangular main magnets are symmetrically arranged about the longitudinal axis of the armature with a pair of main magnets on each side thereof. A brush is positioned between each pair of magnets on opposite sides of the armature for contact with the conductors of the outer layer of the armature so that the motor is self-commutating. The armature, main magnets, and brushes are enclosed within a suitable housing to form a motor.

The present invention is illustrated in the accompanying drawings, in which.

Figure 1:
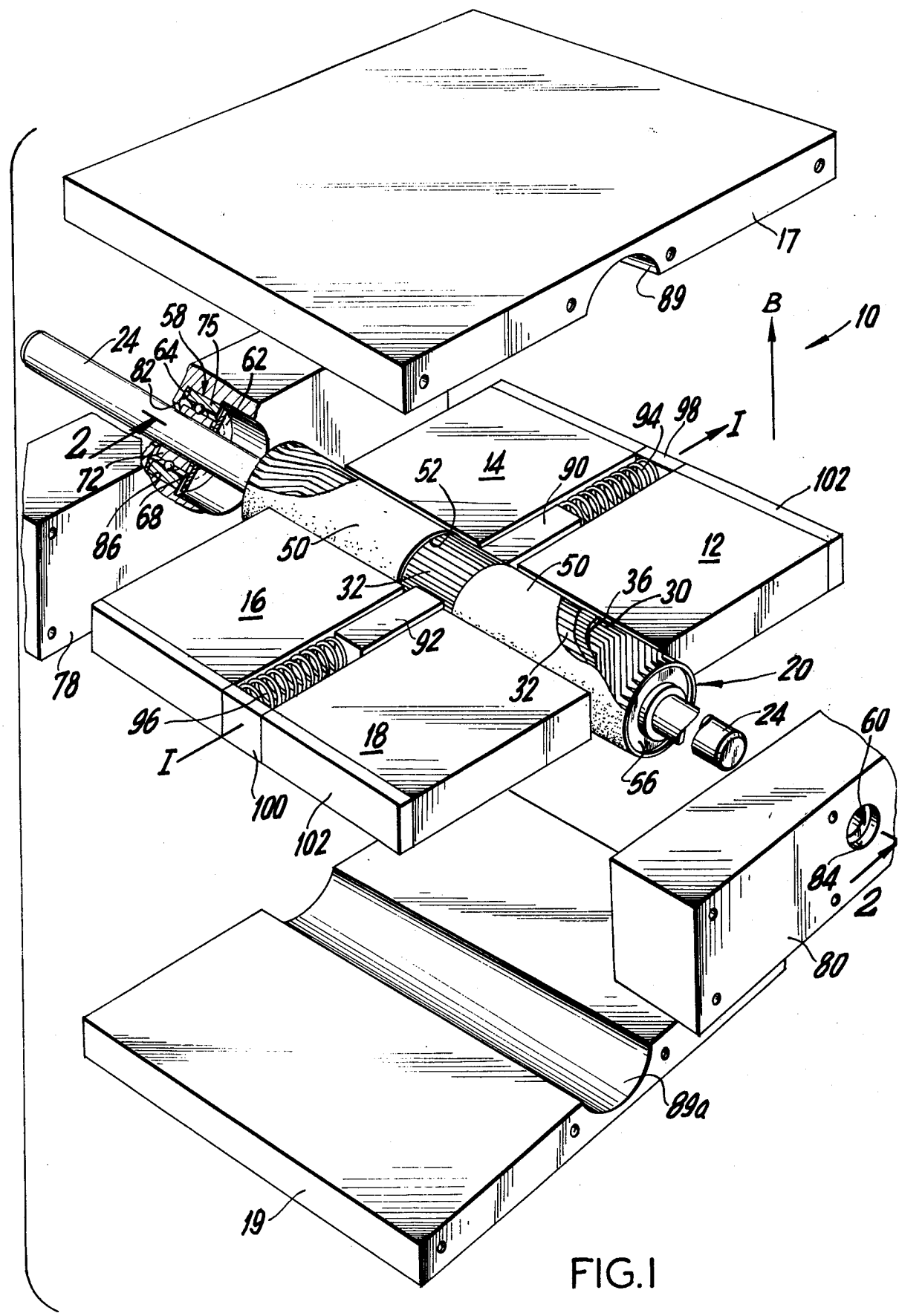
FIG. 1 is an exploded view of a D.C. motor according to the present invention, with parts broken away to facilitate description.

Referring to FIG. 1, the D.C. motor 10 is shown including four flat permanent magnets 12, 14, 16, and 18 for generating a magnetic field B. The magnets 12, 14, 16, and 18 are sandwiched between side plates 17 and 19, which serve as return paths for the magnetic flux. The four flat permanent magnets 12, 14, 16, and 18 are solid and generally rectangular in shape.

Figure 2:
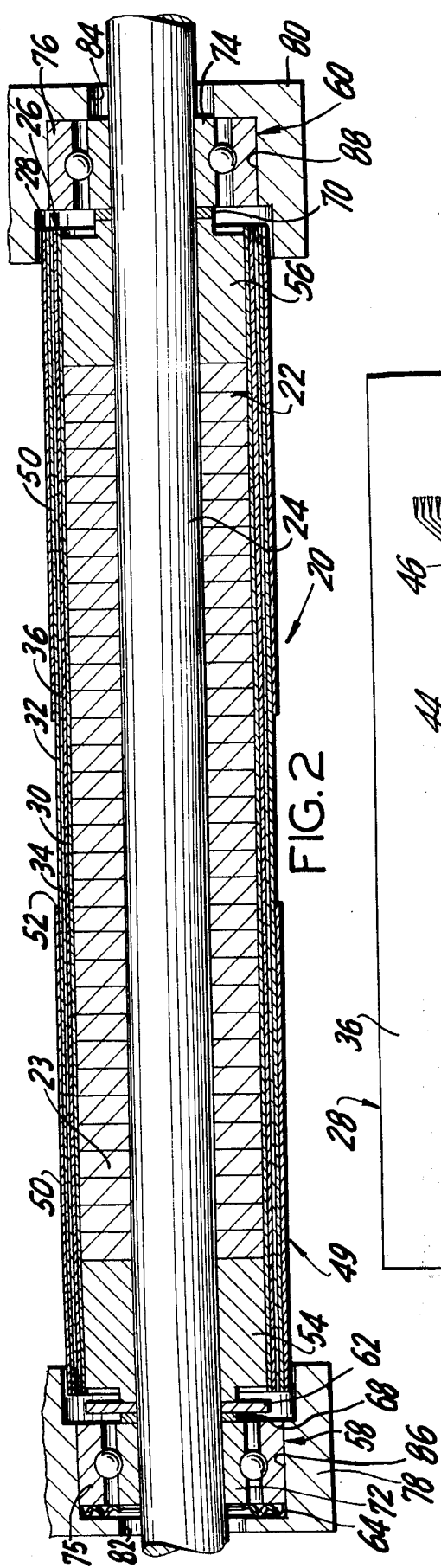
FIG. 2 is a longitudinal cross sectional view taken along line 2—2 of FIG. 1, showing the armature.

A cylindrical armature 20 is centrally arranged between spaced pairs of magnets 12 and 14, and 16 and 18, respectively, located on opposite sides of the armature 20. As seen in FIG. 2, the armature 20 includes a cylindrical core 22, of low reluctance material, preferably iron, which is concentrically mounted on a steel output shaft 24. The iron core 22 is formed in a laminated or segmented structure to reduce hysteresis losses. Preferably, the core 22 includes a stack of stamped washers 23, typically each washer 23 is 12 mils in thickness. Each washer 23 is electrically insulated from adjacent washers 23, e.g., by a film of varnish or an oxide film.

Figure 3:
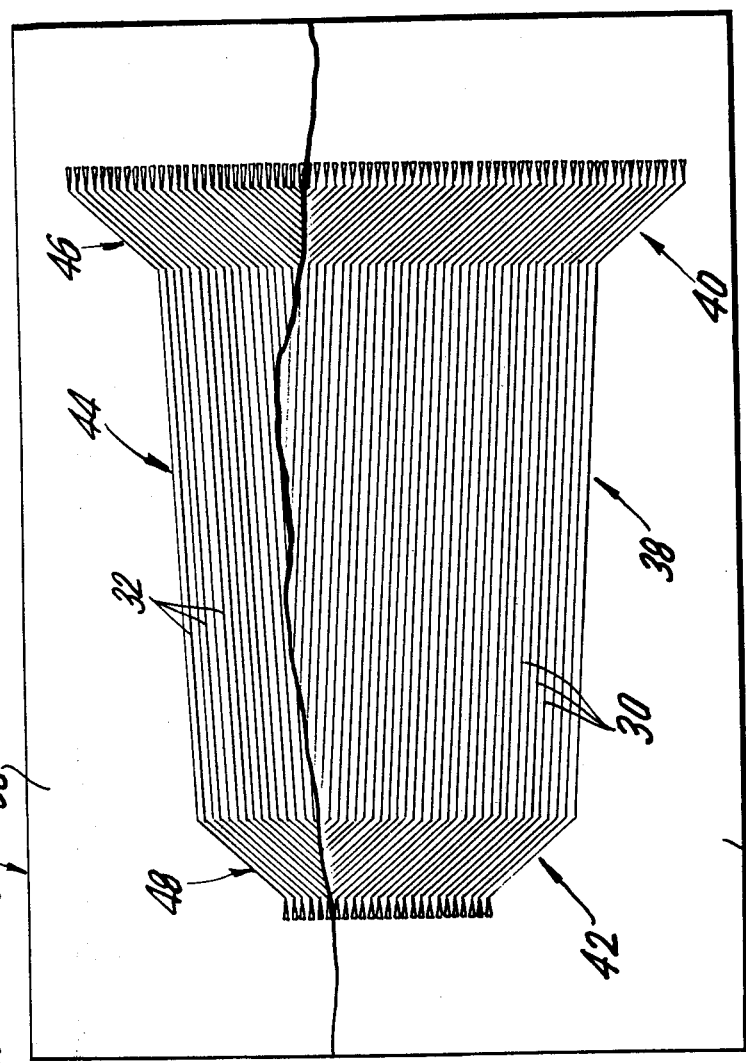
FIG. 3 is a plane view with portions removed showing the printed circuit conductive elements of the two layers.

Referring also to FIGS. 2 and 3, the cylindrical armature 20 also includes two layers 26 and 28 of spaced printed circuit conductive elements 30 and 32 bonded to insulating sheets 34 and 36. Advantageously, in forming the layers 26 and 28, conductive sheets are bonded to insulating sheets and the individual conductive elements 30 and 32 are formed with the use of printed circuit techniques, e.g., etching.

With specific reference to FIG. 3, the bottom layer 26 includes 49 conductive elements 30 and has a central or intermediate section 38, in which the individual conductive elements 30 are preferably skewed a maximum of about 3°, and crossover end sections 40 and 42. The top layer 28 also includes 49 conductive elements 32, and has a central or intermediate section 44, in which the individual conductive elements 32 are preferably skewed a maximum of about 3°, and crossover end sections 46 and 48. As a result of skewing, the conductive elements 30 and 32 in the central sections 38 and 44 of the layers 26 and 28 are oriented at an oblique angle to the longitudinal axis of the output shaft 24. The crossover end sections 40 and 42, and 46 and 48 provide the proper circumferential spacing for interconnection of the conductive elements 30 and 32 of the layers 26 and 28.

In forming the armature 20, the top layer 28 is positioned over the bottom layer 26 so that the skew of the conductive elements 32, including crossover end sections 46 and 48, of the top layer 28 is opposite to that of the conductive elements 30, including crossover end sections 40 and 42 of the bottom layer 26, see FIG. 3. Skewing of the conductive elements 30 and 32 strengthens the cylindical armature 20 and reduces the resistance resulting from interconnecting the crossover sections of the layers 26 and 28.

The conductive elements 30 and 32 are formed by etching thin copper sheets, preferably about 3 mils to about 5 mils in thickness which are bonded, e.g., by epoxy, to fiberglass insulating layers 34 and 36. Advantageously, the conductive elements 32 of the top layer 28 may have a thickness of about 5 mils and the conductive elements 30 of the bottom layer about 3 mils. The two layers 26 and 28 are blanked to the outline of the conductor pattern and then bonded together, e.g., with epoxy, and formed into a cylinder of proper dimensions on a mandrel.

An outer layer or sheath 50 of insulating material, such as fiberglass thread, may be bonded, e.g. with epoxy, to the outer layer 28 to further reinforce the cylindrical shape of the armature 20. A central or intermediate portion 52 of the outer sheath 50 is removed to provide a gap for exposing the conductive elements 32 of the central section 44 of the top layer 28.

The crossover end sections 40 and 42, and 46 and 48, of layers 26 and 28, respectively, are interconnected, e.g., by soldering or welding. The completed outer armature tube 49 is removed from the mandrel and bonded to the iron core 22, e.g., with epoxy.

In forming the completed motor 10, a pair of bearing spacers 54 and 56 are concentrically mounted on the shaft 24 adjacent the ends of the iron core 22. Bearings 58 and 60 are mounted on the shaft 24 adjacent the bearing spacers 54 and 56, respectively. A ring washer 62 having a diameter equal to the diameter of the iron core 22 is arranged between bearing spacer 54 and bearing 58. A spring washer 64 is positioned on the side opposite to the ring washer 62 in contact with the outer race of bearing 58, and flat washers 68 and 70 are positioned between the inner races 72 and 74 of bearings 58 and 60 and the ring washer 62 and bearing spacer 56, respectively. The bearings 58 and 60 have their inner races 72 and 74 bonded to the output shaft 24 and their outer races 75 and 76 bonded to end plates 78 and 80.

The end plates 78 and 80, which are preferably made of aluminum, are mechanically coupled to the side plates 17 and 19, e.g., with screws (not shown) to hold the motor 10 in an assembled condition. The end plates 78 and 80 include axially aligned apertures 82 and 84 which receive the ends of output shaft 24. Enlarged recesses 86 and 88 in the shape of stepped cylinders are arranged in the end plates 78 and 80 concentric with the apertures 82 and 84 to receive the bearings 58 and 60, and portions of bearing spacers 54 and 56. Side plates 17 and 19 include arcuate channels 89 and 89a for rotation of the armature 20 within the assembled motor 10.

Centrally arranged on opposite sides of the armature 20 and positioned between adjacent magnets 12 and 14, and 16 and 18, respectively, are opposing brushes 90 and 92. The brushes 90 and 92 are solid and rectangular in shape and biased for contact with the exposed conductive elements 32 of the top layer 28 of the armature 20 by springs 94 and 96, respectively. The springs 94 and 96 have one end mechanically coupled to contact terminals 98 and 100 and their other end engaging brushes 90 and 92.

The assembled motor 10 may also include four rectangular spacing strips 102 which may be made of rubber. The spacing strips 102 are positioned adjacent the magnets 12, 14, 16, and 18 at the outer end thereof and have one end in contact with the contact terminals 98 or 100 and their other end in contact with end plates 78 or 80. It may be advantageous in some applications, e.g., where reduction of magnetic leakage is desired, to replace the spacing strips 102 with edge magnets.

In operating the motor 10, main magnets 12, 14, 16, and 18 set up a magnetic field B in the direction indicated by the arrow marked B. A d.c. current (I) is applied to the terminal 100 and carried by brush 92 to the outer conductive elements 32 in contact therewith. The current travels through these outer conductive elements 32 and as a result of the interconnection of the conductive elements 30 and 32 through certain of the inner conductive elements 30, and back through the outer conductive elements 32 in contact with brush 90 and through brush 90 to terminal 98, completing the circuit.

According to basic electromagnetic theory, a force is applied to the individual conductive elements 30 and 32 of the armature 20 due to the interaction of field B and the current I passing through the conductive elements 30 and 32. The vector equation $F = IL \times B$ defines the force acting upon each of the conductive elements 30 and 32 of the armature 20 through which the current passes. These forces cooperate to apply a force couple to the armature 20 causing rotation of the armature 20 and shaft 24 at a speed dependent upon the length of the conductive elements 30 and 32, the strength of the magnetic field B and the magnitude of the current I.

It should be understood by those skilled in the art that various modifications may be made in the present invention without departing from the spirit and scope thereof as described in the specification and defined in the appending claims.

What is claimed is:

1. A self-commutating motor comprising:
   a housing;
   a printed circuit armature arranged within said housing, said printed circuit armature including a rotatable core with exposed elements at its outer surface;
   a plurality of permanent magnets symmetrically arranged within said housing relative to said printed circuit armature;
   a pair of brushes transversely and centrally positioned relative to said printed circuit armature on opposite sides thereof and biased for engagement with said exposed conductive elements of said printed circuit armature to establish a commutator region therewith;
   terminal means electrically coupled to said brushes for applying current thereto; and
   said housing including flux return means positioned adjacent said magnets for providing a return path for the magnetic flux produced by said magnets.

2. A self-commutating motor comprising:
   a housing;
   a printed circuit armature arranged within said housing, said printed circuit armature including a rotatable core with exposed conductive elements at its outer surface;
   four flat permanent magnets symmetrically arranged within said housing in pairs on opposite sides of said printed circuit armature;
   a pair of brushes transversely and centrally positioned relative to said printed circuit armature on opposite sides thereof and biased for engagement with said exposed conductive elements of said printed circuit armature to establish a commutator region therewith, one of said brushes being positioned between said magnets of said first pair and the other brush being positioned between said magnets of said second pair;
   terminal means electrically coupled to said brushes for applying current thereto; and
   said housing including flux return means positioned adjacent said magnets for providing a return path for the magnetic flux produced by said magnets.

3. A self-commutating motor comprising:
- a housing;
- a printed circuit armature arranged within said housing, said printed circuit armature including a rotatable core with exposed conductive elements at its outer surface;
- a plurality of permanent magnets symmetrically arranged within said housing relative to said printed circuit armature;
- edge magnets adjacent to said permanent magnets to reduce flux leakage;
- a pair of brushes transversely positioned relative to said printed circuit armature on opposite sides thereof and biased for engagement with said exposed conductive elements of said printed circuit armature to establish a commutator region therewith;
- terminal means electrically coupled to said brushes for applying current thereto; and
- said housing including flux return means positioned adjacent said magnets for providing a return path for the magnetic flux produced by said magnets.

4. A printed circuit armature for an electric motor comprising:
- a cylindrical laminated core of low reluctance material;
- an inner layer of insulating material concentrically bonded to said cylindrical laminated core, said inner layer having a plurality of printed circuit conductive elements arranged on its outer surface; and
- an outer layer of insulating material concentrically bonded to said inner layer of insulating material, said outer layer having a plurality of printed circuit conductive elements arranged on its outer surface, said conductive elements of said inner and outer layers being electrically connected.

5. A printed circuit armature as claimed in claim 4 wherein:
- said conductive elements of said inner and outer layers include an intermediate skewed section and crossover end sections.

6. A printed circuit armature as claimed in claim 5 wherein:
- said conductive elements of said inner layers are skewed in a direction opposite to said conductive elements of said outer layer.

7. A printed circuit armature as claimed in claim 5 including:
- a cylindrical insulating sheath bonded to the outer insulating layer, said insulating sheath having an intermediate gap therein to expose said conductive elements of said outer layer.

8. A printed circuit armature as claimed in claim 4 wherein:
- each of said layers includes 49 conductive elements.

9. A printed circuit armature as claimed in claim 4 wherein:
- said conductive elements have a thickness of 3 mils.

10. A printed circuit armature as claimed in claim 4 wherein:
- said conductive elements of said inner layer have a thickness of 3 mils;
- said conductive elements of said outer layers have a thickness of 5 mils.

11. A printed circuit armature as claimed in claim 4 wherein:
said conductive elements have a maximum skew angle of about 3°.

12. A self-commutating motor comprising:
- a housing;
- a printed circuit armature arranged within said housing, said printed circuit armature including a rotatable core of low reluctance material with exposed conductive elements at its outer surface;
- a plurality of permanent magnets symmetrically arranged within said housing relative to said printed circuit armature;
- a pair of brushes transversely positioned relative to said printed circuit armature on opposite sides thereof and biased for engagement with said exposed conductive elements of said printed circuit armature to establish a commutator region therewith;
- terminal means electrically coupled to said brushes for applying current thereto; and
- said housing including flux return means positioned adjacent said magnets for providing a return path for the magnetic flux produced by said magnets.

13. A self-commutating motor as claimed in claim 12 wherein:
said conductive elements are skewed.

14. A self-commutating motor comprising:
- an armature including at least one insulated layer of printed circuit conductive elements affixed to a laminated core of low reluctance material, said core being fixedly mounted about a rotatable shaft;
- a pair of spring-biased brushes mounted on opposite sides of said armature and arranged to contact said printed circuit conductive elements of said armature in a commutator region for supplying current to the said printed circuit conductive elements;
- four flat rectangular permanent magnets symmetrically mounted on opposite sides of said armature adjacent said brushes;
- a pair of flux return members overlying said magnets and said armature, each of said flux return members having an arcuate channel for rotation of said armature and shaft therein; and
- end means for maintaining the relative position of said flux return members and said magnets and armature.

15. A self-commutating motor as claimed in claim 14 wherein:
said laminated core is made of iron.

16. A self-commutating motor as claimed in claim 14 wherein the armature includes:
- a first layer of insulation surrounding said core and having printed circuit conductors arranged thereon;
- a second layer of insulation surrounding said first layer and having printed circuit conductors arranged thereon, said printed circuit conductors of said first and second layers being interconnected; and
- a third layer of insulation surrounding the second layer and having a central gap therein to provide a commutator region for contact with said brushes.

17. A self-commutating motor as claimed in claim 16 wherein:
said conductive elements of said first layer are skewed in a direction opposite to said conductive elements of said second layer.

18. A self-commutating motor as claimed in claim 14 including:

edge magnets adjacent to said permanent magnets to reduce flux leakage.

* * * * *